F. H. WILBUR.
VEHICLE WHEEL.
APPLICATION FILED MAR. 24, 1920.
1,415,751.
Patented May 9, 1922.
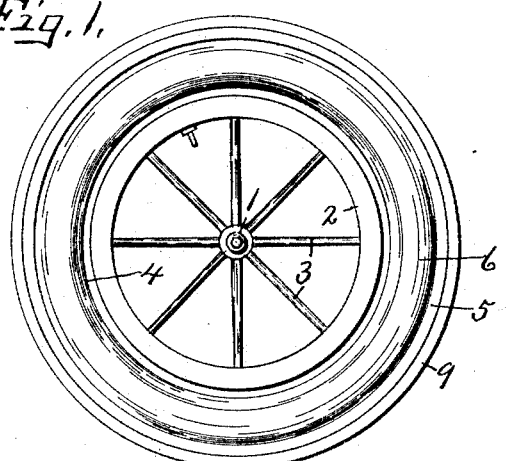
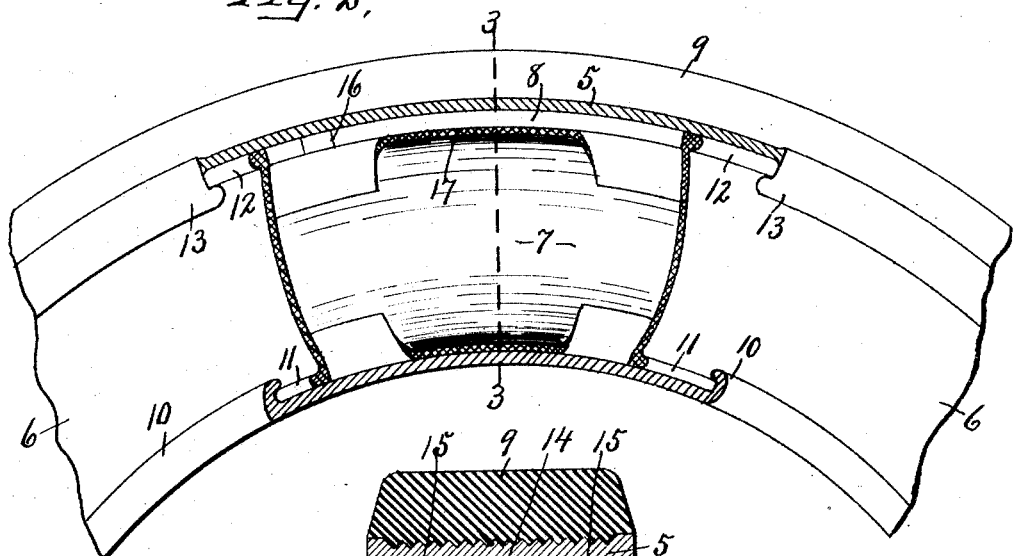
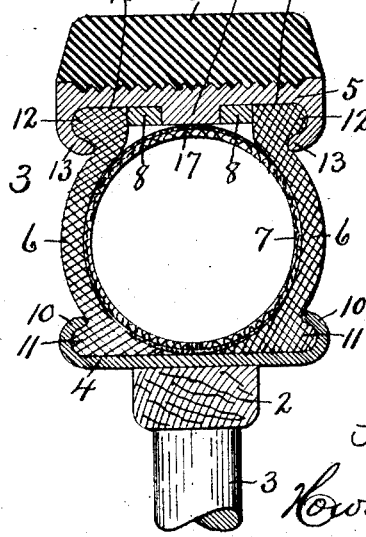

UNITED STATES PATENT OFFICE.

FREDERICK H. WILBUR, OF BINGHAMTON, NEW YORK, ASSIGNOR OF ONE-FOURTH TO GEORGE A. REYNOLDS AND ONE-FOURTH TO SAMUEL W. REYNOLDS, BOTH OF BINGHAMTON, NEW YORK.

VEHICLE WHEEL.

1,415,751.            Specification of Letters Patent.            Patented May 9, 1922.

Application filed March 24, 1920. Serial No. 368,212.

*To all whom it may concern:*

Be it known that I, FREDERICK H. WILBUR, of Binghamton, in the county of Broome, in the State of New York, have invented new and useful Improvements in Vehicle Wheels, of which the following, taken in connection with the accompanying drawings, is a full, clear, and exact description.

This invention relates to certain improvements in vehicle wheels involving the use of an inflatable pneumatic tube and opposing casing sections interposed between an inner rim and an outer rim, and refers more particularly to the means for clamping and releasing the outer portions of the casing sections in and from the outer rim.

The main object is to provide simple and efficient means for locking the casing sections to the outer rim from the inside in such manner as to firmly hold the outer rim in place even though the tire may be deflated while the wheel is in motion, and, at the same time, to protect the locking means from the elements and contact with external objects.

Another object is to project the edges of the outer rim laterally a sufficient distance to protect the outer sides of the casing sections against contact with curbs, the sides of ruts and other objects, which otherwise would cause excessive wear or injury to said sections.

Other objects and uses relating to specific parts of the wheel will be brought out in the following description:

In the drawings:

Figure —1— is a side elevation of a vehicle wheel embodying the features of my invention.

Figure —2— is an enlarged longitudinal sectional view, partly in elevation, of a portion of the tire including the inner and outer rims.

Figure —3— is a transverse sectional view taken in the plane of line 3—3, Figure 2.

As illustrated, this wheel comprises a hub —1— and felly —2— connected by spokes —3—, and a tire consisting of an inner rim —4—, an outer rim —5—, opposite casing sections —6— connecting the inner and outer rims —4— and —5—, and an inflatable tube —7— between the casing sections —6—, and also between the inner and outer rims, together with suitable means, as split clamping rings —8—, for locking and releasing the outer portions of the case sections in and from the outer rim —5—, which latter may be surrounded by a solid rubber tread —9—.

The inner rim —4— as shown, is of the clincher type having the usual overturned marginal flanges —10— and annular grooves for receiving and retaining the inner portions of the case sections —6—.

These case sections are similar and interchangeable, and are preferably made of flexible elastic material, such as rubber, felt, or rubber covered fabric, and are continuous circumferentially and concavo-convex in cross section, so that when assembled in reverse relation upon the inner rim, their inner concave faces will conform closely to the transversely circular form of the inner tube —7—.

In other words, the casing sections —6— constitute what may be termed flexible protective shields for protecting the inner tube —7— and clamping members —8— against exposure to the elements and contact with external objects, and also serve as tie pieces between the inner and outer rims —4— and —5—.

The inner edges of the casing sections —6— rest directly upon the periphery of the inner rim —4— with their meeting faces spaced apart from each other, and their side edges provided with annular ribs —11—, which interlock with the overturned flanges —10— to hold the casing sections against lateral and outward radial displacement when adjusted for use.

The outer edges of the casing sections —6— are of less transverse width than their inner edges, so that when the parts of the tire are assembled, said outer edges will be in spaced relation transversely, or at equal distances at opposite sides of the longitudinal center of the tire to receive between them the clamping members or rings —8—, and are provided along their opposite sides with annular ribs —12— for interlocking engagement with inturned grooved flanges —13— on the outer rim —5—, thereby holding said outer rim and casing sections against relative lateral and radial displacement, particularly, when the inner tube is inflated or deflated.

The outer rim —5— is provided with an inner annular rib —14— midway between, and preferably of less radial depth than the outer flanges —13—, thereby forming two annular grooves —15— in the inner face of the outer rim between the annular ribs or flanges —13— and —14— for receiving the adjacent edges of the casing sections —6— and clamping rings —8—.

The periphery of the outer rim —5— is corrugated or ribbed transversely to form alternate annular grooves and ribs, against which the inner face of the thread —9— is secured by vulcanizing or cementing, or in any other well known manner not necessary to herein illustrate or describe.

The rings —8— are identical and interchangeable, and are preferably made of spring steel divided transversely through one side, as at —16—, and tensioned to expand against the inner face of the outer rim —5— within the grooves —15— so as to fill the space between the opposite faces of the annular rib —14— and adjacent faces of the casing sections —6— to hold the latter in interlocking engagement with the flanges —13— when the parts are adjusted for use, the radial thickness of said rings being substantially equal to the radial depth of the rib —14— so that their inner faces may coincide transversely to form a bearing for the inner tube, which latter is, in this instance, reenforced by a protective lining —17— of heavy ducking or canvas to avoid excessive wear of the adjacent portion of the inner tube by friction with the inner faces of the rings —8— and rib —14—.

The inner and outer rims —4— and —5—, and particularly the outer rim, are made of sufficient width to project laterally to or slightly beyond the corresponding outer faces of the casing sections —6— to protect said casing sections against contact with curbs and other external objects which might otherwise cause excessive wear or injury to those parts.

By constructing and assembling the parts in the manner described, the opposite edges of the outer rim —5— and outer faces of the casing sections —6— are practically smooth and unbroken throughout their circumferences, the casing sections —6— also serving to protect the clamping members —8— from the elements including snow, ice, dust and other foreign matter, which enables them to be easily and quickly removed in case the inner tube should become impaired to such an extent as to require its replacement by a new one.

In case it should become necessary to remove the inner tube either from impairment or other cause, the inner tube is first deflated, thereby releasing the outward pressure upon the casing sections —6—, under which conditions, one or both of the casing sections may be removed by springing its inner edge inwardly sufficiently to disengage it from the corresponding flange —10—, thereby allowing the freed edge to be drawn outwardly a sufficient distance to permit the withdrawal of the inner tube, which, in turn, would afford access to the rings —8—.

The end of the adjacent ring may then be pried inwardly by a suitable tool, such as a screw driver, and gradually unseated from the corresponding groove —15— until brought within the annular flange —14—, thereby freeing the adjacent edge of the corresponding tire section —6— and allowing the latter to be withdrawn.

In like manner, the other casing section may also be withdrawn if desired, it being understood that by reversing the above operations the casing sections and other parts may be restored or readjusted for use without the use of any external fastening means, all of which contributes materially to the strength, durability and commercial efficiency of wheels of this character.

What I claim is:

1. In a vehicle wheel, the combination of inner and outer circular rims in radially spaced relation, the outer rim having inturned marginal flanges along its opposite edges, and also provided with an intermediate inwardly projecting rib midway between the flanges for forming annular channels between said rib and flanges, separate flexible casing sections having their inner edges seated on the inner rim and their outer edges seated in said channels against the inner faces of the flanges, an inflatable tube between the casing sections, and separate split clamping rings seated in the channels between the rib and adjacent portions of the casing sections to hold the outer edges of said casing sections in engagement with the flanges.

2. In a vehicle wheel, the combination of inner and outer rim sections in radially spaced relation, and provided with marginal flanges along their opposite longitudinal edges projecting radially toward each other, the outer rim having an intermediate circumferential extending rib projecting inwardly substantially midway between its flanges, separate flexible casing sections of concavo-convex cross section arranged with their concave sides facing each other and having their inner edges engaged with the inner faces of the flanges of the inner rim, and their outer edges engaged with the inner faces of the flanges of the outer rim in transversely spaced relation to said rib to form annular spaces between said rib and adjacent edges of the casing, an inflatable tube between the casing sections, and separate split clamping rings in said spaces between said rib and adjacent portions of the outer edges of the casing sections for holding the latter in engagement with the flanges of the outer rim and spring-tensioned against the inner face of the outer rim.

3. In a vehicle wheel, the combination of inner and outer circular rims in radially spaced relation, the outer rim being provided with inturned annular flanges along its marginal edges, separate flexible casing sections seated on the inner rim and engaged with the inner faces of said flanges, an inflatable tube between said casing sections, separate split rings seated against the inner face of the outer rim at opposite sides of the longitudinal center of said outer rim and engaging the inner faces of the outer edges of the casing sections for holding the latter in engagement with the flanges, and means for holding said split rings in transversely spaced relation.

In witness whereof I have hereunto set my hand this 19th day of March, 1920.

FREDERICK H. WILBUR.

Witnesses:
T. W. WHIPPLE,
R. W. WHIPPLE.